US009182253B2

(12) United States Patent
Courchaine et al.

(10) Patent No.: US 9,182,253 B2
(45) Date of Patent: Nov. 10, 2015

(54) OPTICAL FIBER EVENT SENSOR

(71) Applicant: AFL TELECOMMUNICATIONS LLC, Duncan, SC (US)

(72) Inventors: Wilfred Courchaine, Moore, SC (US); Roger Vaughn, Greer, SC (US); Theodore Lichoulas, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/371,915

(22) PCT Filed: Jan. 14, 2013

(86) PCT No.: PCT/US2013/021429
§ 371 (c)(1),
(2) Date: Jul. 11, 2014

(87) PCT Pub. No.: WO2013/106820
PCT Pub. Date: Jul. 18, 2013

(65) Prior Publication Data
US 2015/0003774 A1    Jan. 1, 2015

Related U.S. Application Data

(60) Provisional application No. 61/586,217, filed on Jan. 13, 2012.

(51) Int. Cl.
G02B 6/00    (2006.01)
G01D 5/26    (2006.01)
G02B 6/38    (2006.01)

(52) U.S. Cl.
CPC .............. G01D 5/268 (2013.01); G02B 6/3825 (2013.01); G02B 6/3897 (2013.01)

(58) Field of Classification Search
CPC ..... G01D 5/268; G02B 6/3825; G02B 6/3897
USPC ........................................................ 385/12
See application file for complete search history.

(56) References Cited

U.S. PATENT DOCUMENTS 4,729,630 A * 3/1988 Martinez .......................... 385/13
4,800,267 A * 1/1989 Freal et al. ................ 250/227.16
4,890,896 A 1/1990 Meis
5,818,982 A * 10/1998 Voss et al. ........................ 385/13

(Continued)

OTHER PUBLICATIONS

International Search Report for PCT/US2013/021429 dated Mar. 26, 2013 [PCT/ISA/210].

(Continued)

*Primary Examiner* — Peter Radkowski
(74) *Attorney, Agent, or Firm* — Sughrue Mion, PLLC

(57) ABSTRACT

An optical fiber attenuation sensor that includes a first protrusion movable between a first position and a second position, a second protrusion movable between a third position to a fourth position, and an elastic object coupled to the first protrusion that causes the first protrusion to move from the first position to the second position. When the first protrusion moves from the first position to the second position, the second protrusion moves from the third position to the fourth position. The second protrusion is configured and positioned to cause an event in a signal in an optical fiber when the second protrusion moves from the third position to the fourth position.

11 Claims, 7 Drawing Sheets

(56) References Cited

U.S. PATENT DOCUMENTS

| | | |
|---|---|---|
| 6,218,941 B1 | 4/2001 | Cromer et al. |
| 6,937,151 B1* | 8/2005 | Tapanes .................. 340/550 |
| 2005/0147340 A1* | 7/2005 | Tapanes .................. 385/12 |
| 2008/0174428 A1* | 7/2008 | Piper et al. .............. 340/555 |
| 2008/0192240 A1 | 8/2008 | Tucker et al. |
| 2009/0040046 A1* | 2/2009 | Browning et al. ........ 340/552 |
| 2011/0293235 A1 | 12/2011 | Nieves et al. |

OTHER PUBLICATIONS

Written Opinion for PCT/US2013/021429 dated Mar. 26, 2013 [PCT/ISA/237].

* cited by examiner

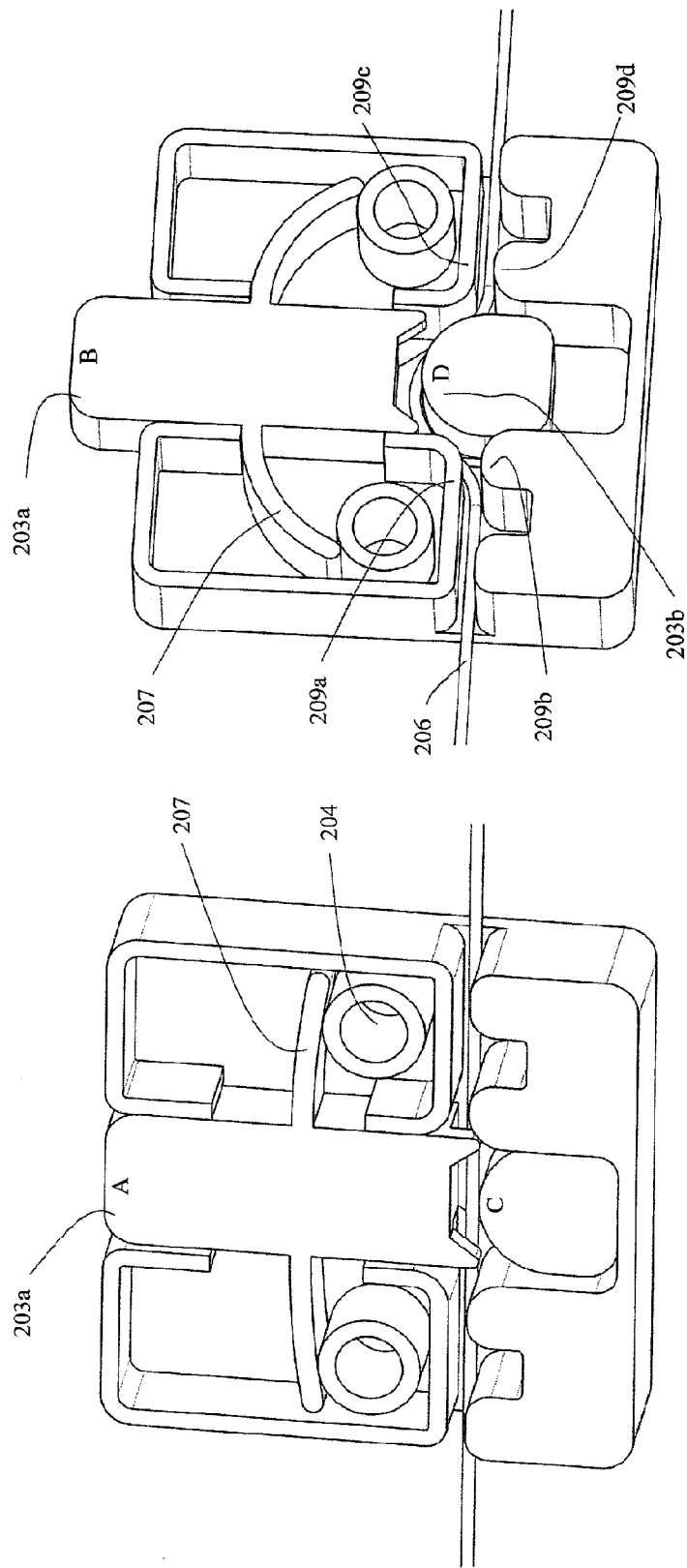

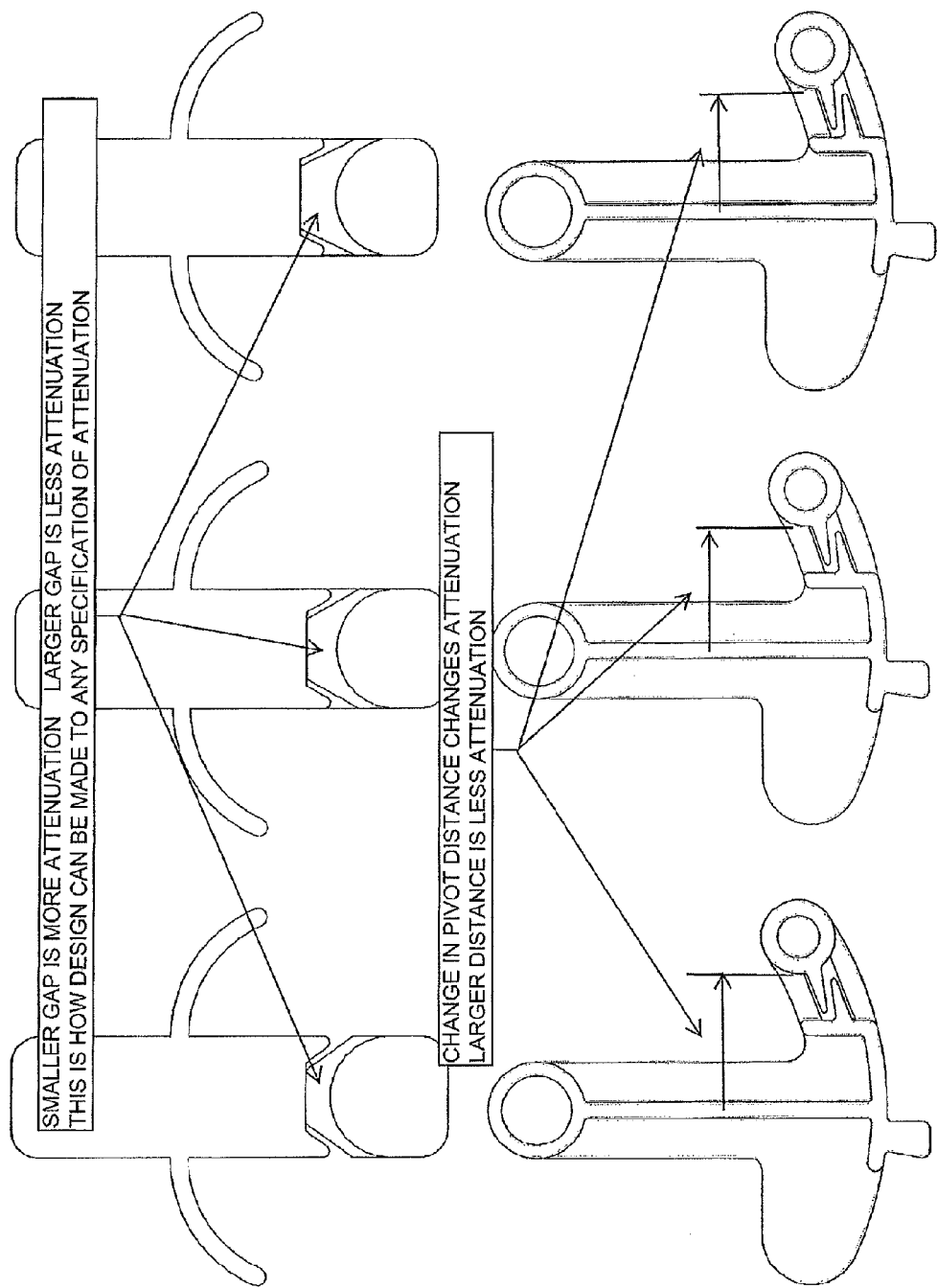

OPTICAL FIBER EVENT SENSOR

CROSS-REFERENCE TO RELATED APPLICATIONS

This application is based upon and claims the benefit of priority from U.S. Provisional Application No. 61/586,217, filed Jan. 13, 2012 in the United States Patent and Trademark Office, the disclosure of which is incorporated herein in its entirety by reference.

BACKGROUND

1. Field

The invention is related to an optical fiber event sensor, and more particularly to an optical fiber event sensor that can be used to detect if an enclosure is opened or a structure is moved.

2. Related Art

In the telecommunications and other fields, there are often times where a network is established for communicating data and other forms of transmissions and the network needs to have a security method in place to protect the network from various intrusions. Components of the network are often placed into cabinets, closets, pedestals and various enclosed devices. Access to these components is typically given only to technicians from the network provider. Any other access to these devices could be an unwanted trespasser or perhaps someone that could damage the components or the fibers and wiring inside of the closed in unit.

As a result, it would be a great benefit if access to these locations could be monitored. Existing products that are used for this are generally electrical in nature and require the wiring and terminations that are associated with installing electrical devices. These electrical door switches and more sophisticated products are costly and require maintenance of the electrical system used. Therefore, there is a need for a lower cost and more versatile solution.

Additionally, there are often requirements to have a switch to be used to indicate other signals. Security and machine operations need to have indicators of position and activity. Proximity and limit type switches exist, but again, these are typically electrically operated. There is a need for other modes of operation in these and other areas.

It is an object of the invention to provide a simple, low-cost and versatile non-electrical solution.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

An embodiment of the invention is an optical fiber attenuation sensor that includes a first protrusion movable between a first position and a second position, a second protrusion movable between a third position and a fourth position, and an elastic object coupled to the first protrusion that causes the first protrusion to move from the first position to the second position. When the first protrusion moves from the first position to the second position, the second protrusion moves from the third position to the fourth position. The second protrusion is configured and positioned to cause an event in a signal in an optical fiber when the second protrusion moves from the third position to the fourth position.

Other features of the invention include said event being a detectable attenuation of said signal.

Other features of the invention include an optical fiber holder configured to hold an optical fiber such that when the second protrusion moves from the third position to the fourth position, an event in a signal is caused in the optical fiber.

Other features of the invention include an optical fiber positioned such that when the second protrusion moves from the third position to the fourth position, an event in a signal is caused in the optical fiber, and two optical fiber receptacles connected to the optical fiber. The optical fiber receptacles are configured to connect to external optical fibers.

BRIEF DESCRIPTION OF THE DRAWING

FIG. 7 shows an internal view of the exemplary second embodiment of an optical fiber attenuation sensor of the invention with the first and second protrusions in first and third positions, respectively.

FIG. 8 shows an internal view of the exemplary second embodiment of an optical fiber attenuation sensor of the invention with the first and second protrusions in second and fourth positions, respectively.

FIG. 9 shows how adjustments may be made to the protrusions to adjust the amount of attenuation caused to a signal.

DETAILED DESCRIPTION

Figure 2:
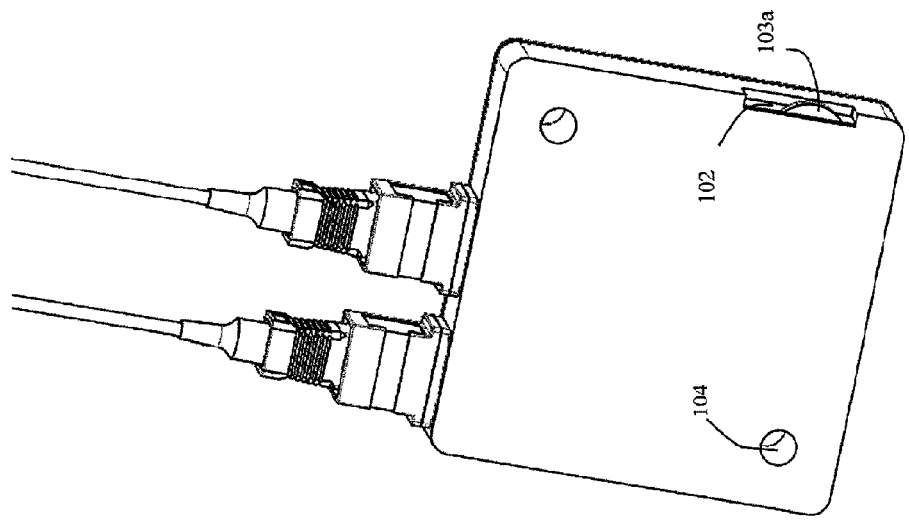
FIG. 2 shows an external bottom view of an exemplary first embodiment of an optical fiber attenuation sensor of the invention.
Figure 1:
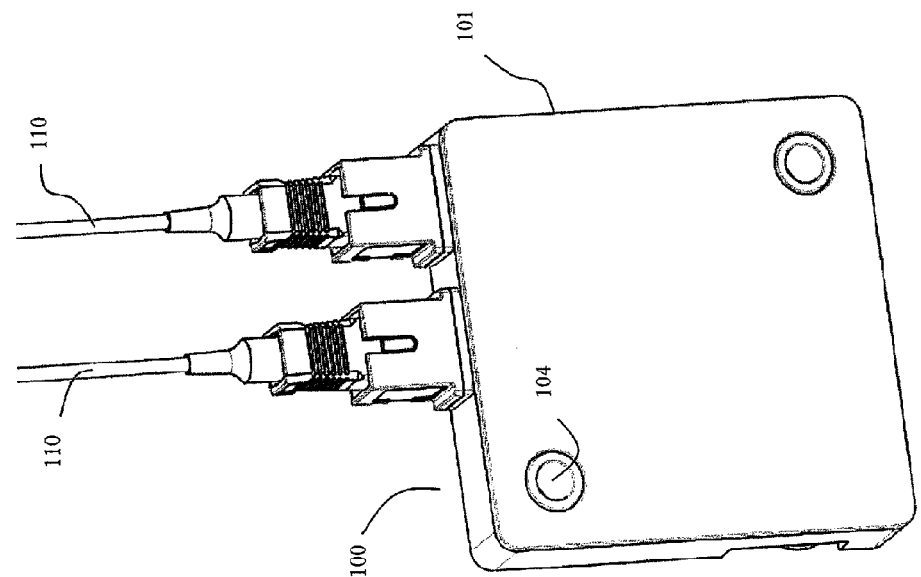
FIG. 1 shows an external top view of an exemplary first embodiment of an optical fiber attenuation sensor of the invention.

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The simple, low-cost and versatile non-electrical solution invention has been solved by using optical technology. The invention is a sensor used to indicate whether a cabinet, closet, pedestal or other enclosed devices had been opened. This provides a pathway for a fiber (bare fiber or jacketed) to pass through the unit. The optical fiber allows for transmission of an optical signal to be delivered throughout the network. The switch induces an attenuation of the fiber when it is activated which can be read and located at a central office or security point. The network operator can then take actions as necessary to rectify the intrusion. This can be done using one fiber that runs along the entire network or by multiple fibers based on requirements. The induced attenuation can be detected using existing products, such as an optical time-domain reflectometer (OTDR) and it will indicate which enclosure has been opened based on distance from the measuring device. Individual fibers for each enclosure can also be used. The attenuation method can be used there as well. The invention includes the attenuation inducing sensors for bare or jacketed fiber and the optical disconnect versions.

This invention also includes a sensor that uses connectors to be placed into the network or an uninterrupted fiber that can be placed into the unit without cutting or adding connectors. The uncut fiber can be passed through a channel in the device and attenuation can be introduced when the sensor is activated.

The invention, embodiments of which are shown in FIGS. 1-6, uses optical fiber as its transmission medium rather than electrical methods. The fiber system requires virtually no maintenance or electrical power making it less costly than other systems. The switch can be attached to any door or cover for an enclosed unit. Existing fibers in the network cables can be used to operate the system.

This invention can also be applied to identify intrusions or disruptions in other areas. Building or home security at doors and windows can also use this method. Fences and perimeters can be monitored using variations of the invention. Other uses could be in machinery interlocks and anywhere that an indication of an action has occurred.

Some of the advantages and benefits of this design are in the ability to include this in an optical fiber based system. There would be low maintenance and power costs. An entire network can be monitored with one fiber. The cost of the device will be very low compared to electrical switches. The installation of the device only requires attachment to the enclosure and plugging in the connectors of the fiber or placing the uncut fiber into the channel. The operation of the switching network would require only one optical input and no electricity. The amount of attenuation or a complete disconnect can be obtained with versions of the invention. As used in this specification, an "event" can be the attenuation of a signal in the optical fiber, or a complete loss (disconnect) of the signal in the optical fiber.

Hereinafter, the exemplary embodiments will be described with reference to accompanying drawings.

FIGS. 1-4 show a first exemplary embodiment of the optical fiber attenuation sensor 100. It includes an enclosure 101 with an opening 102. Two connectors receptacles 105 and 105 are attached to the enclosure 101. The connector receptacles 105 and 105 allow for the connection of external fibers 110 to be connected to an optical fiber 106. Optical fiber 106 can be an optical fiber or an optical fiber in a cable/jacket. An example of an optical fiber that can be used with this embodiment is raw fiber (250 microns), 900 micron (diameter of furcation on fiber) up to 4 mm diameter. The design would likely use bend insensitive fiber so that the complete package remains small. However, other types of optical fibers may be used as well. The length of optical fiber 16 may vary, in order to increase the accuracy of locating the sensor. While this embodiment shows a single loop, optical fiber 106 may be looped more than once. At least a portion of the optical fiber 106 is held in position by a holder 109a, 109b, 109c so that a signal in the optical fiber 106 can be attenuated. Others configurations of holders may be used as long as they allow the signal in the cable to be attenuated. The sensor 100 may also include mounting structures, such as holes 104. Other mounting structures and methods may be used.

The sensor 100 also includes a first protrusion 103a and a second protrusion 103b. These protrusions can be formed into many different shapes and configurations. Coupled to the protrusion tab 103a is an elastic object 107. In this embodiment, the elastic object is a spring; however, other elastic objects may be used as well. As shown in the figures, the elastic object 107 does not have to be directly coupled to the first protrusion 103a.

Figure 4:
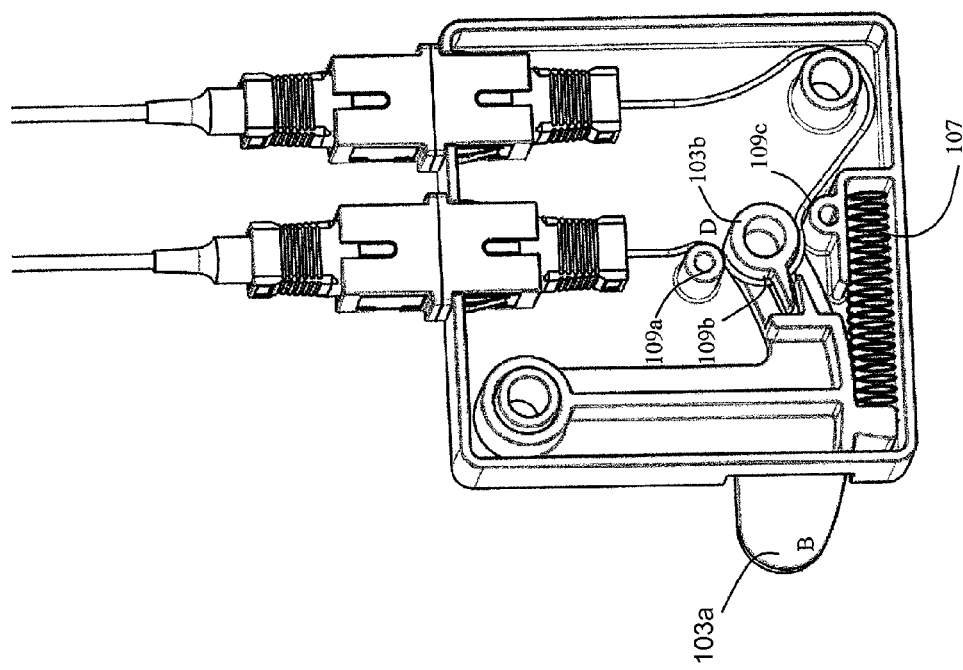
FIG. 4 shows an internal view of the exemplary first embodiment of an optical fiber attenuation sensor of the invention with the first and second protrusions in second and fourth positions, respectively.
Figure 3:
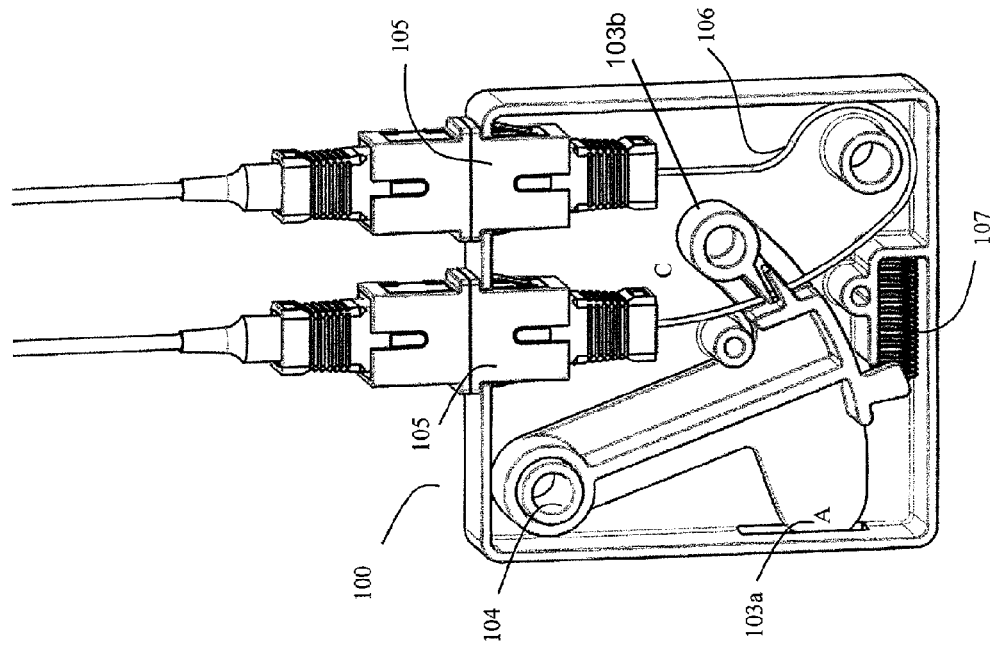
FIG. 3 shows an internal view of the exemplary first embodiment of an optical fiber attenuation sensor of the invention with the first and second protrusions in first and third positions, respectively.
Figure 6:
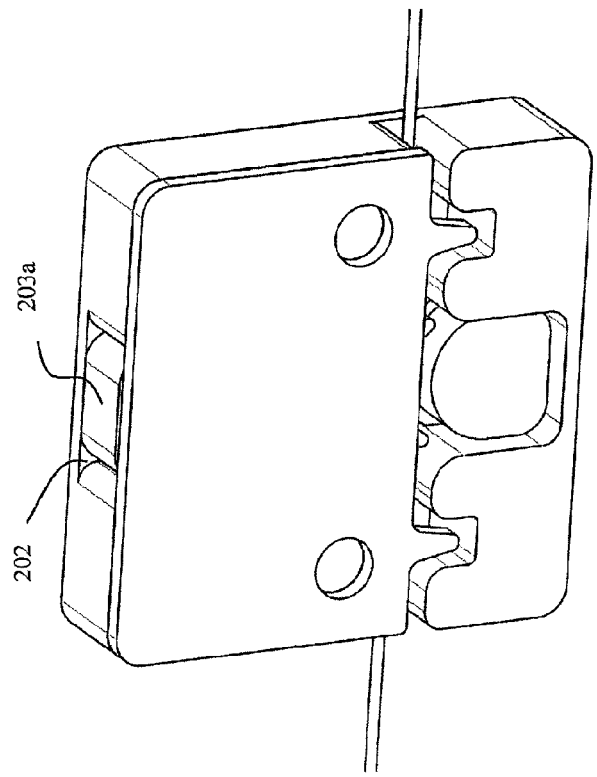
FIGS. 5 and 6 show an external top view of an exemplary second embodiment of an optical fiber attenuation sensor of the invention.
Figure 5:
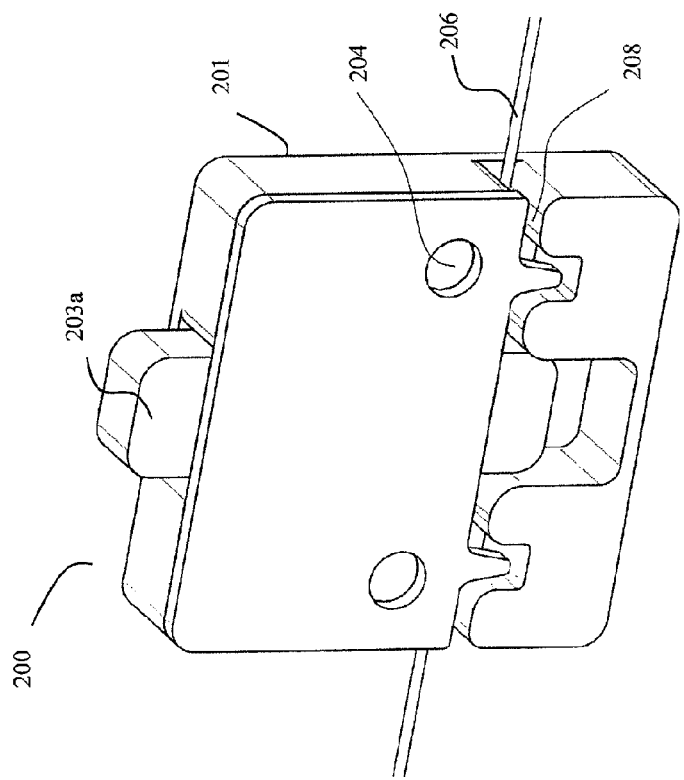

The elastic object 107 causes the first protrusion 103a to move from a first position A to a second position B. FIG. 3 shows the first protrusion 103a in the first position A. FIG. 4 shows the first protrusion 13a in the second position B. For example, if a closed door (not shown) is next to first protrusion 103a in position A, the sensor 100 would be as shown in FIG. 3. When the door is opened, the elastic object 107 causes the first protrusion 103a to move through an opening 102 to the second position B, as shown in FIG. 4.

When the first protrusion 103a is in the first position A, the second protrusion 103b is in the third position C. When the first protrusion 103a moves to the second position B, it causes the second protrusion 103b to move to the fourth position D. As the second protrusion 103b moves to the fourth position D, it pushes against optical fiber 106, which causes attenuation of a signal in optical fiber 106. The amount of attenuation can vary based on the configuration and positioning of the second protrusion 103b. See for example, FIG. 9. A typical loss could be in the range of 0.5 to 1 dB. In a preferred embodiment, the loss should be set such that it can be detected by an OTDR, but not substantially interfere with transmission of the signal.

In an alternate version of this embodiment, a disconnect could be created, rather than an attenuation of a signal. For example, the second protrusion 103b could be connected to one of the connectors on the ends of optical fiber 106. The movement between the third position C and the fourth position D could disconnect/connect the connector from the receptacle 105.

FIGS. 5-8 show a second exemplary embodiment of the optical fiber attenuation sensor 200. It includes an enclosure 201 with an opening 202. A slot 208 is formed for insertion of an optical fiber 206. Optical fiber 206 can be an optical fiber or an optical fiber in a cable/jacket that is part of an external network or in a cabinet/enclosure that is being monitored. A portion of the optical fiber 206 is held in position by a holder 209a, 209b, 209c, 209d so that a signal in the optical fiber 206 can be attenuated. The sensor 200 may also include mounting structures, such as holes 204.

The sensor 200 also includes a first protrusion 203a and a second protrusion 203b. These protrusions can be formed into many different shapes and configurations. Coupled to the first protrusion 203a is an elastic object 207. In this embodiment, the elastic object is a bendable piece of plastic; however, other elastic objects may be used as well. The elastic object 207 does not have to be directly coupled to the first protrusion 203a.

The elastic object 207 causes the first protrusion 203a to move from a first position A to a second position B. FIG. 7 shows the first protrusion 203a in the first position A. FIG. 8 shows the first protrusion 203a in the second position B. For example, if a closed door (not shown) is next to first protrusion 203a in position A, the sensor 200 would be as shown in FIG. 7. When the door is opened, the elastic object 207 causes the first protrusion 203a to move through an opening 202 to the second position B, as shown in FIG. 8.

When the first protrusion 203a is in the first position A, the second protrusion 203b is in the third position C. When the first protrusion 203a moves to the second position B, it causes the second protrusion 203b to move to the fourth position D. As the second protrusion 203b moves to the fourth position D, it pushes against optical fiber 206, which causes attenuation of a signal in optical fiber 206. The amount of attenuation can vary based on the configuration and positioning of the second protrusion 203. See FIG. 9. A typical loss should be in the range of 0.5 to 1 dB. In a preferred embodiment, the loss should set such that it can be detected by an OTDR, but not substantially interfere with transmission of the signal.

Figure 10:
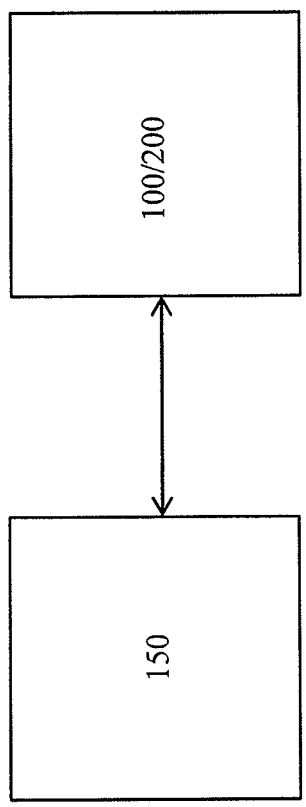
FIG. 10 shows a functional block diagram of an exemplary use of the optical fiber attenuation sensor of the invention connected to an optical time-domain reflectometer (OTDR).
Figure 11:
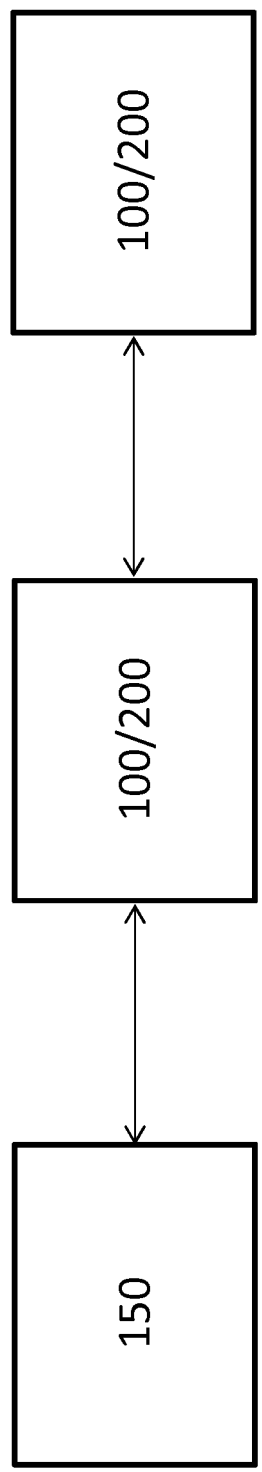
FIG. 11 shows a functional block diagram showing multiple optical fiber attenuation sensors connected to an optical time-domain reflectometer.

FIG. 10 shows a functional block diagram of an exemplary use of the optical fiber attenuation sensor 100/200 of the invention connected to an OTDR 150.

As mentioned above, although the exemplary embodiments described above are various types of sensor, they are merely exemplary and the general inventive concept should not be limited thereto, and it could also apply to other types of optical fiber sensors. In particular, while the invention may be used in enclosures and cabinet, the invention may be used in other types of applications where detection of a moving object is necessary.

What is claimed:

1. An optical fiber attenuation sensor comprising:
   a first protrusion movable between a first position and a second position;
   a second protrusion movable between a third position and a fourth position;
   an elastic object coupled to said first protrusion that causes said first protrusion to move from said first position to said second position;
   an optical fiber segment contained in a housing of said optical fiber attenuation sensor; and
   two optical fiber receptacles connected to said optical fiber, wherein when said first protrusion moves from said first position to said second position, said second protrusion moves from said third position to said fourth position;
   wherein said second protrusion is configured and positioned to cause an event to a signal in said optical fiber segment when said second protrusion moves from said third position to said fourth position; and
   wherein said optical fiber receptacles are configured to connect to external optical fibers.

2. The optical fiber attenuation sensor according to claim 1, wherein said event is a detectable attenuation of said signal.

3. The optical fiber attenuation sensor according to claim 1, further comprising an optical fiber holder configured to hold said optical fiber segment such that when said second protrusion moves from said third position to said fourth position, said event to said signal is caused in said optical fiber segment.

4. The optical fiber attenuation sensor according to claim 3, wherein said event is a detectable attenuation of said signal.

5. The optical fiber attenuation sensor according to claim 1, wherein said event is a disconnection of said signal.

6. The optical fiber attenuation sensor according to claim 3, wherein said optical fiber segment is looped more than once around said optical fiber holder.

7. An optical fiber attenuation sensor comprising:
   a first protrusion movable between a first position and a second position;
   a second protrusion movable between a third position and a fourth position;
   an elastic object coupled to said first protrusion that causes said first protrusion to move from said first position to said second position; and
   a housing including a slot extending from one side of the housing to an opposite side of the housing,
   wherein said slot is configured to accommodate an optical fiber;
   wherein when said first protrusion moves from said first position to said second position, said second protrusion moves from said third position to said fourth position; and
   wherein said second protrusion is configured and positioned to cause an event to a signal in said optical fiber when said second protrusion moves from said third position to said fourth position.

8. The optical fiber attenuation sensor according to claim 1, wherein said optical fiber attenuation sensor is coupled to an optical fiber based communications network.

9. The optical fiber attenuation sensor according to claim 7, wherein said optical fiber attenuation sensor is coupled to an optical fiber based communications network.

10. An optical fiber attenuation sensor system, comprising an optical fiber;
    an optical time-domain reflectometer;
    a first optical fiber attenuation sensor and a second optical fiber attenuation sensor, each respectively comprising:
       a first protrusion movable between a first position and a second position;
       a second protrusion movable between a third position and a fourth position; and
       an elastic object coupled to said first protrusion that causes said first protrusion to move from said first position to said second position;
    wherein when said first protrusion of said first optical fiber attenuation sensor moves from said first position to said second position, said second protrusion moves from said third position to said fourth position;
    wherein when said first protrusion of said second optical fiber attenuation sensor moves from said first position to said second position, said second protrusion moves from said third position to said fourth position;
    wherein said second protrusion of said first optical fiber attenuation sensor is configured and positioned to cause an event to a signal in said optical fiber when said second protrusion moves from said third position to said fourth position;
    wherein said second protrusion of said second optical fiber attenuation sensor is configured and positioned to cause the event to the signal in said optical fiber when said second protrusion moves from said third position to said fourth position; and
    wherein said optical time-domain reflectometer is configured to indicate which of said first optical fiber attenuation sensor and said second optical fiber attenuation sensor caused the event in said optical fiber based on distance from said optical time-domain reflectometer.

11. The optical fiber attenuation sensor according to claim 10, wherein said first optical fiber attenuation sensor and said second optical fiber attenuation sensor are coupled to an optical fiber based communications network.

* * * * *